ANDERSON EVANS, OF CINCINNATI, OHIO.

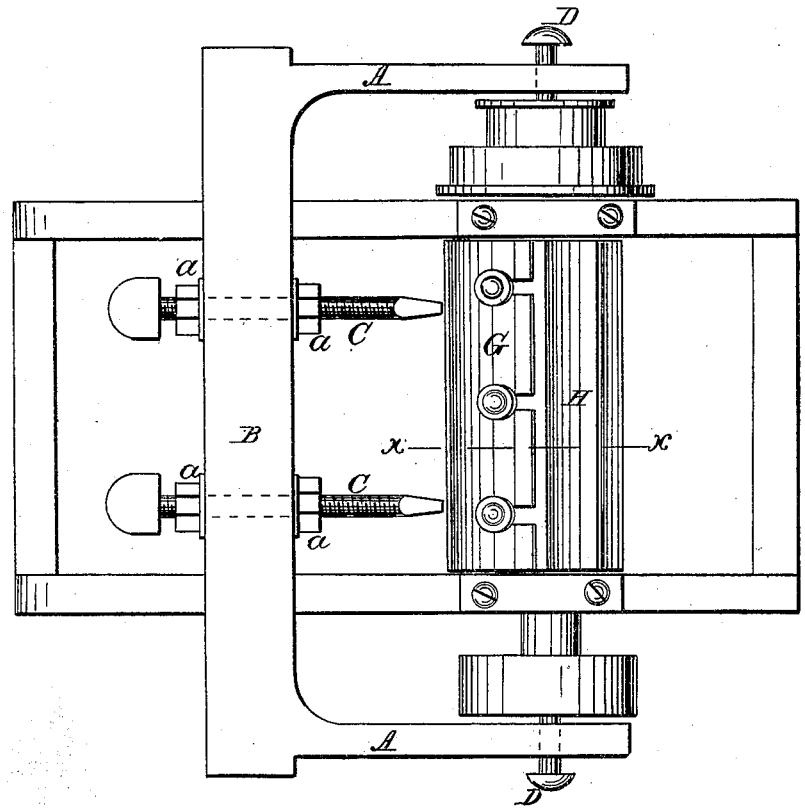

Letters Patent No. 89,394, dated April 27, 1869; antedated April 20, 1869.

IMPROVEMENT IN GAUGE FOR SETTING PLANING-MACHINE CUTTERS.

The Schedule referred to in these Letters Patent and making part of the same.

*To all whom it may concern:*

Be it known that I, ANDERSON EVANS, of Cincinnati, in the county of Hamilton, and State of Ohio, have invented a new and improved Gauge for Setting Planing-Machine Cutters; and I do hereby declare that the following is a full, clear, and exact description thereof, which will enable those skilled in the art to make and use the same, reference being had to the accompanying drawings, forming part of this specification, in which—

Figure 1 is a plan view of a revolving planer with my improved gauge attached.

Figure 2 is a cross-section through the cylinder and cutters.

Similar letters of reference indicate corresponding parts.

The object of this invention is to accomplish the setting of the cutters of planing-machines in an easy and expeditious manner.

Previous to my invention, the cutters of planing-machines were set or adjusted for planing true by trial with a plank previously planed true.

This method involved much delay and trouble, and required a skilled attendant to perform the adjustment, which was often imperfect.

By my invention, the adjustment or "setting," so called, of the cutters of planing-machines, can be conveniently and quickly performed by any person of ordinary skill in such matters.

It consists in a frame or plate formed of three pieces, A A B, affixed together or formed in one continuous piece, and provided with two or more set-screws, C C, passing through hollow threads cut in the part B, as shown.

Jam-nuts *a* are employed to hold the screws fixed when adjusted.

Outer screws D work in hollow threads cut in the parts near the ends of the same, as shown.

The points of these last-mentioned screws are to be set into the centrings of the shaft bearing the planer.

The set-screws C are formed with burr-handles E, so as to enable them to be turned conveniently.

The cutters G, in all planers, are held on the cylinder H, by means of screws passing through slots in the cutters, as shown, which render them adjustable, to cut deep or light, as required.

Now, it will be observed that when one of the cutters is set to the desired cut, and the screws C turned, so that their points will just touch, the edges of the other cutters can easily be brought to touch the points, and thus be in proper adjustment with each other.

It is frequently necessary to remove the cutters and grind them, and by the old method of readjusting them, it was a matter of great difficulty to set them so as to cut as they did before being removed, but by my invention this difficulty is overcome, for it is only required to bring the points of the screws C to touch the edges of the cutters, and to fix this position of the said screws by means of the jam-nuts before mentioned, when the cutters may be removed and ground, and reset without delay, by simply bringing their edges up to the points of the screws C, as shown. The gauge is then removed by unscrewing the screws D.

I am aware of the patent granted to Jonathan Smith, October 13, 1857, for a saw-filer, adapted to be used as a gauge, but I claim nothing therein shown.

I claim as new, and desire to secure by Letters Patent—

The planing-machine gauge, constructed as herein described, consisting of the rectangular frame A A B, having the gauge-screw C in the part B, and the screws D in the ends of the parts A A, and centring in the ends of the arbor of the cutter-head, all arranged to operate as and for the purpose herein set forth.

ANDERSON EVANS.

Witnesses:
S. GRIFFITH,
JOHN MÜLLER.